US009141365B1

(12) United States Patent
Zander et al.

(10) Patent No.: US 9,141,365 B1
(45) Date of Patent: Sep. 22, 2015

(54) INSTALLATION OF A TECHNICAL COMPUTING ENVIRONMENT CUSTOMIZED FOR A TARGET HARDWARE PLATFORM

(71) Applicant: The MathWorks, Inc., Natick, MA (US)

(72) Inventors: Justyna Zander, Framingham, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/136,330

(22) Filed: Dec. 20, 2013

(51) Int. Cl.
*G06F 9/445* (2006.01)
(52) U.S. Cl.
CPC .................................. *G06F 8/61* (2013.01)
(58) Field of Classification Search
CPC .......................................................... G06F 8/61
USPC ................................................. 717/174–178
See application file for complete search history.

(56) References Cited

U.S. PATENT DOCUMENTS

| 7,685,596 | B1 * | 3/2010 | Webb et al. ................... 717/177 |
| 8,415,974 | B1 * | 4/2013 | Lysaght .......................... 326/39 |
| 8,495,622 | B2 * | 7/2013 | Redpath ....................... 717/177 |
| 8,782,635 | B2 * | 7/2014 | Burke et al. .................. 717/174 |

OTHER PUBLICATIONS

Taneem Ahmed, "OpenCL framework for a CPU, GPU, and FPGA Platform", 2011, Master Thesis, University of Toronto, Canada, pp. i-ix, 1-76.*
Cameron et al., "Installable Client Drivers (ICD) Loader", Mar. 2010, retrieved from http://www.khronos.org/registry/cl/extensions/khr/cl_khr_icd.txt , 5 pages.*
Nivault et al., "R4.21—Public Report on Scilab/Scicos code generation for IFP platform and real-time multicore code generation with SynDEx", Mar. 2012, 11 pages.
Gioulekas et al., "An Heterogeneous Co-simulation Environment for Complex Embedded Telecommunication Systems", 2004, 11 pages.
Kestur et al., "BLAS Comparison on FPGA, CPU and GPU", 2010, 6 pages.
Mills et al., "Compiled Instruction Set Simulation", Software—Practice and Experience, vol. 21, No. 8, Aug. 1991, pp. 877-889.
Thomas et al., "A Comparison of CPU's, GPU's, FPGA's and Massively Parallel Processor Arrays for Random Number Generation", Feb. 22-24, 2009, 10 pages.

* cited by examiner

*Primary Examiner* — Ted T Vo
(74) *Attorney, Agent, or Firm* — Harrity & Harrity, LLP

(57) ABSTRACT

A device may receive installation software for installing a technical computing environment to be executed by a hardware platform, and may receive platform information associated with the hardware platform. The device may generate code for the technical computing environment based on the installation software and the platform information, and may generate, based on the code, one or more binary files or bitstream files for installing the technical computing environment on the hardware platform. The device may utilize the one or more binary files or bitstream files to install the technical computing environment on the hardware platform and for execution by the hardware platform. The technical computing environment may be customized for the hardware platform.

23 Claims, 18 Drawing Sheets

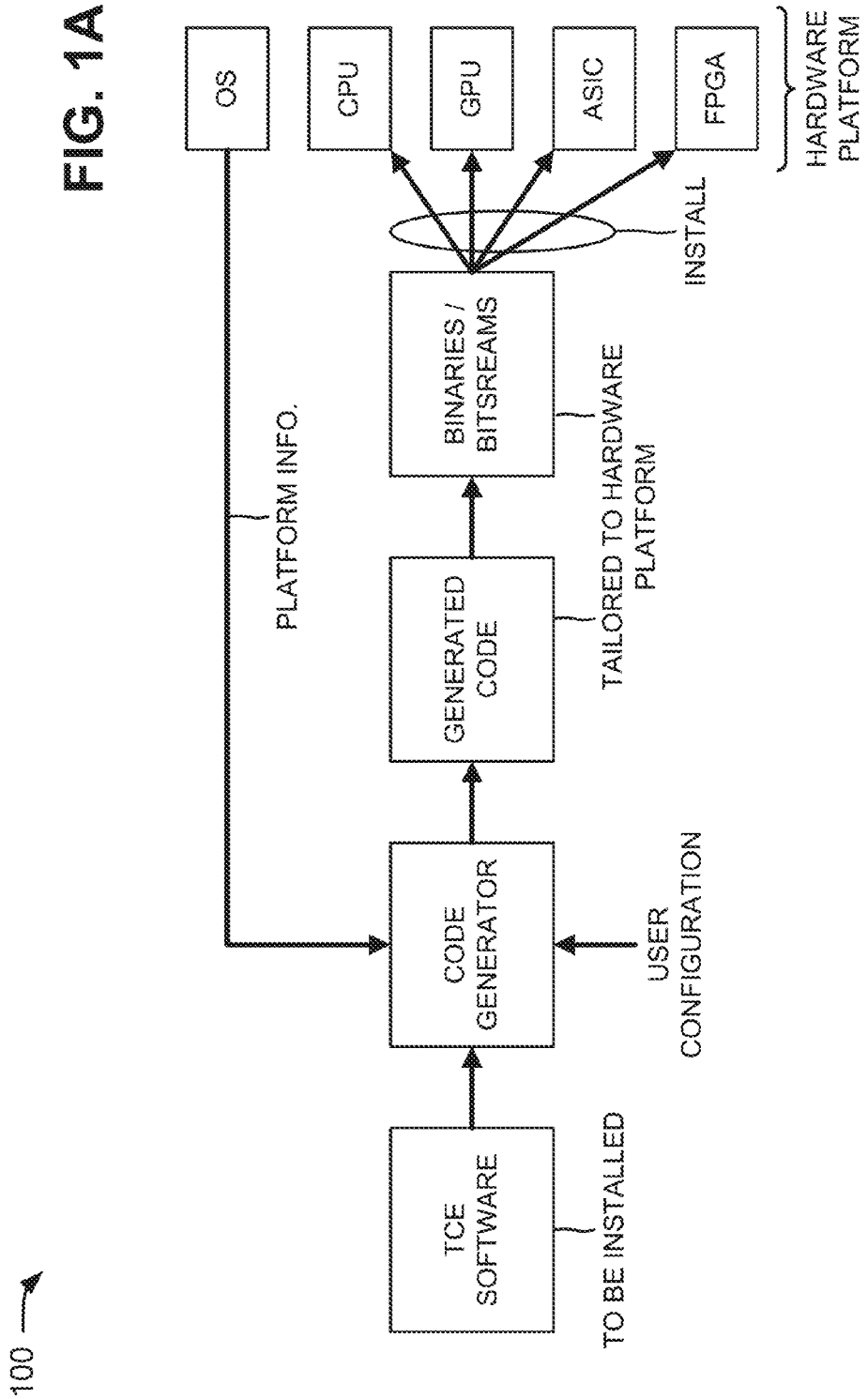

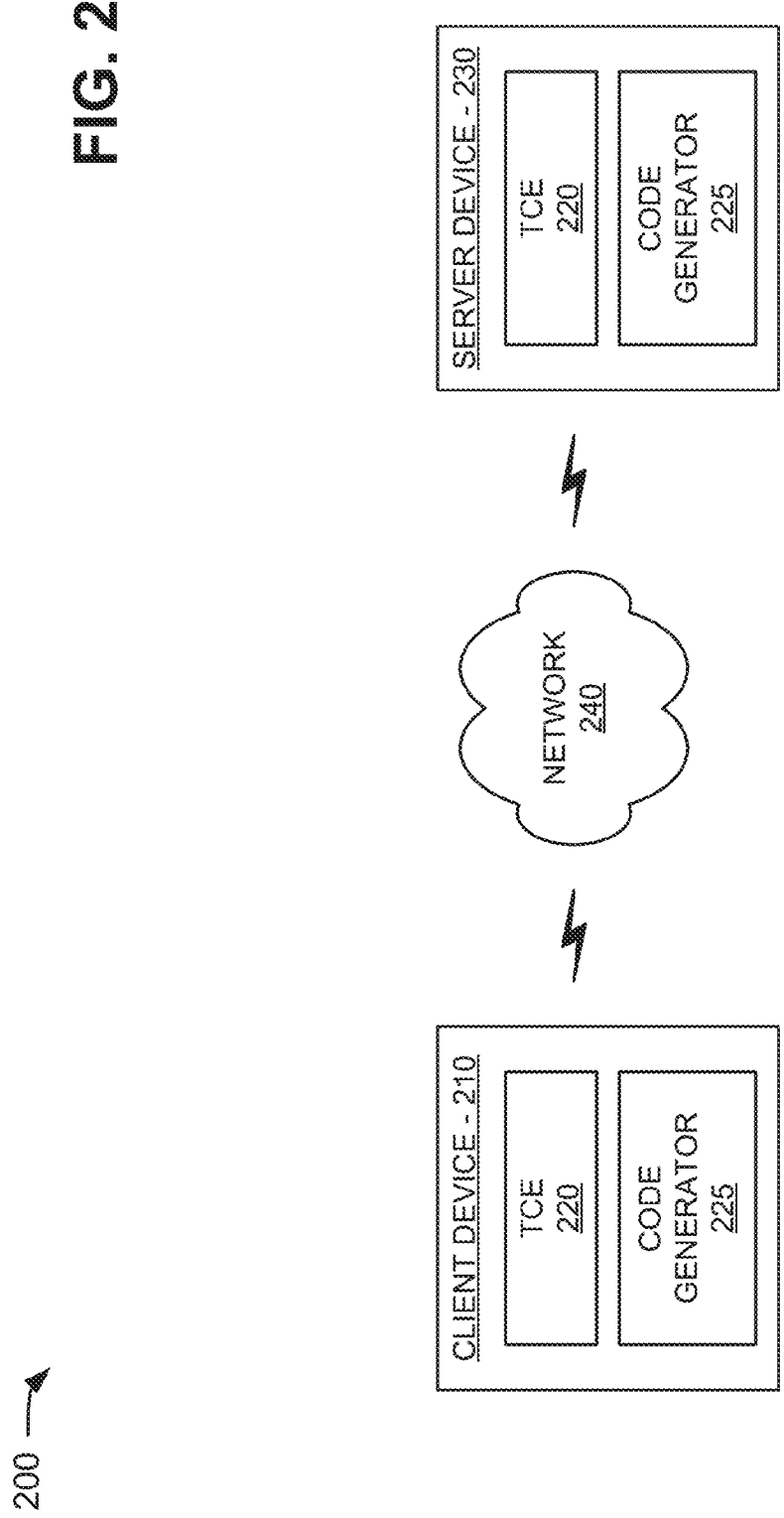

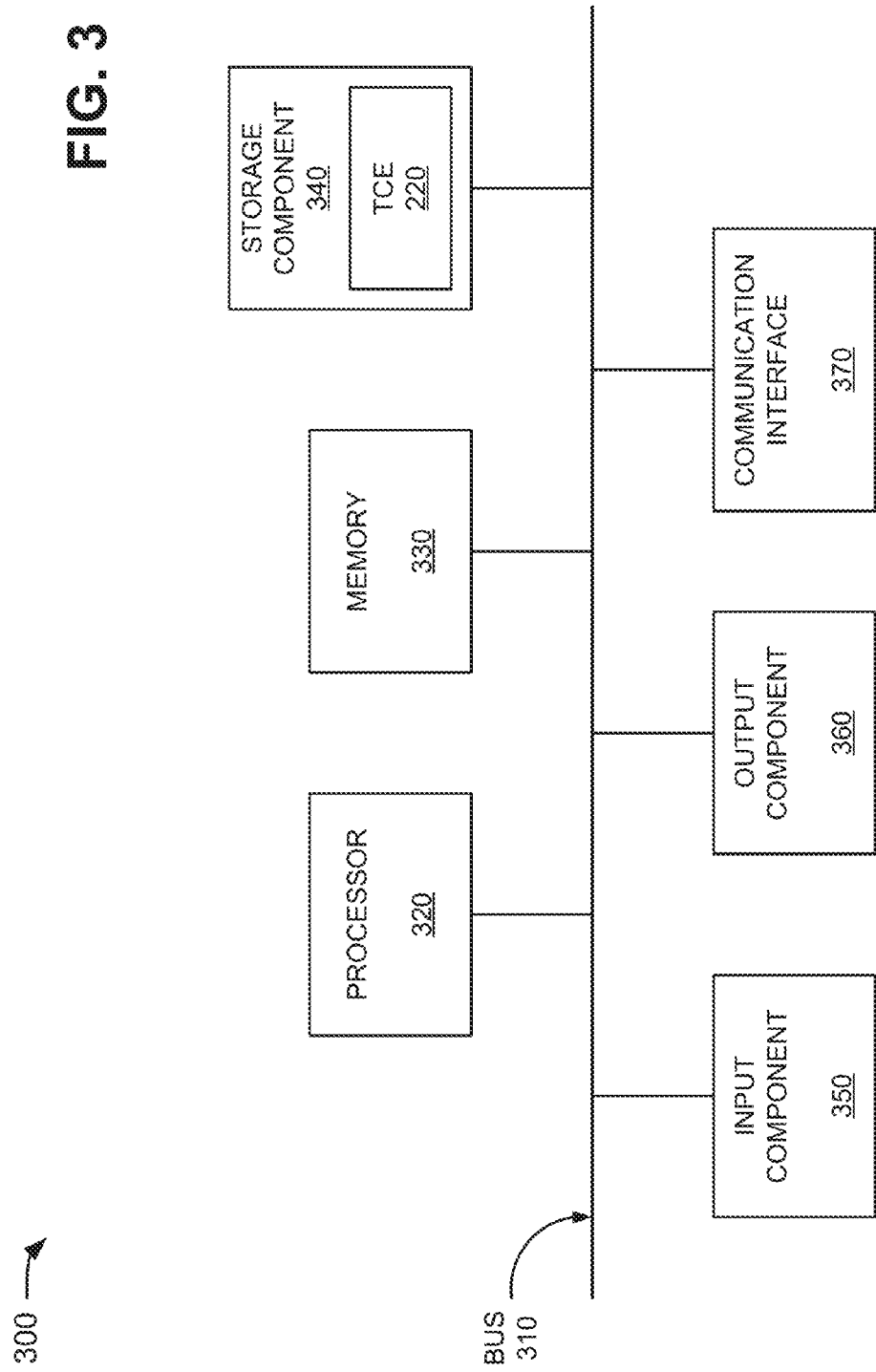

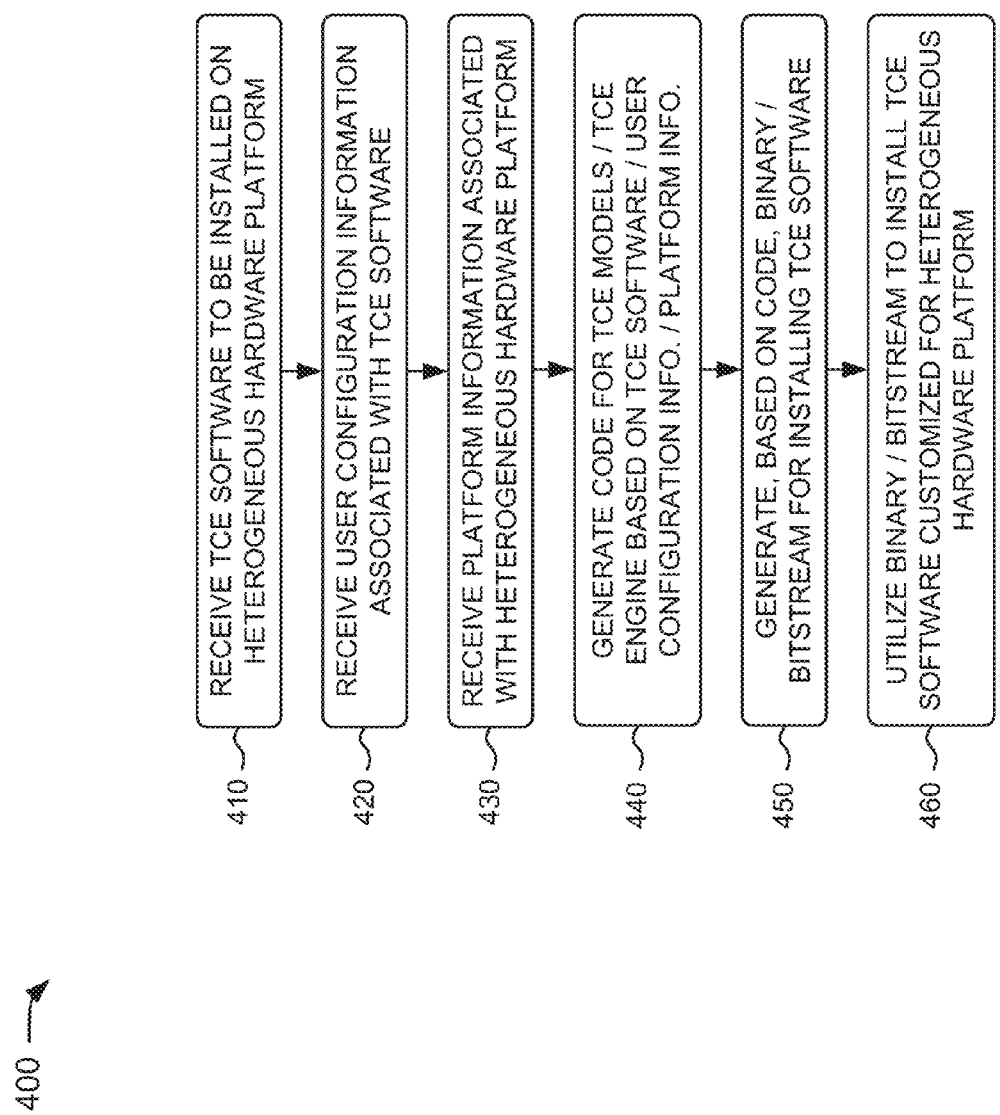

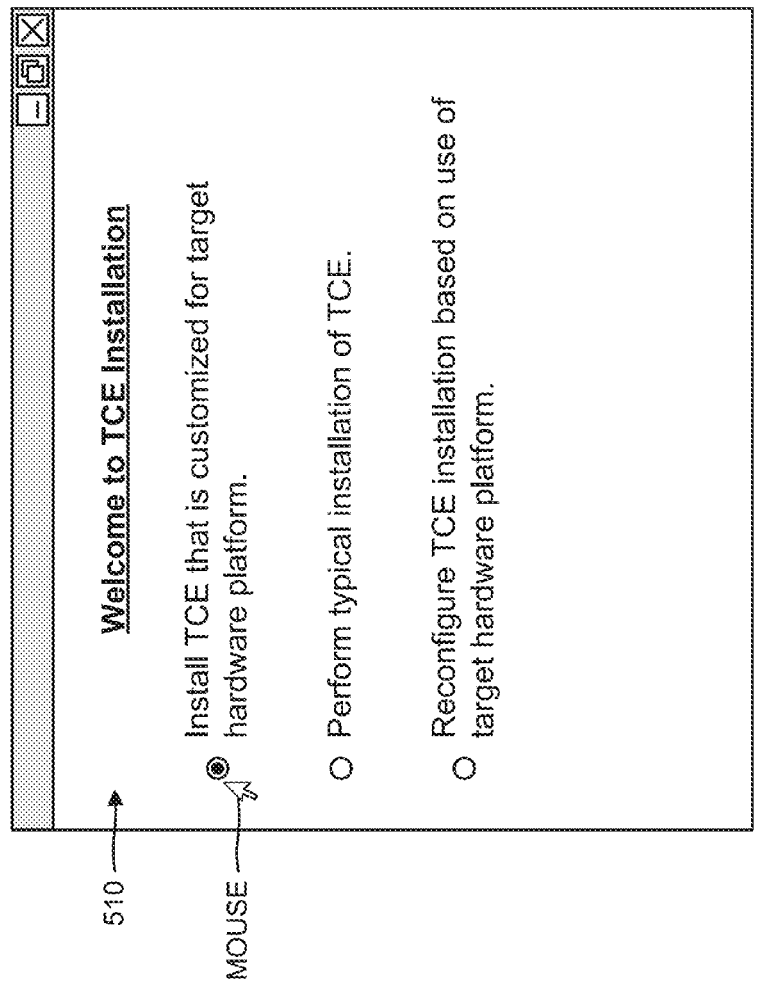

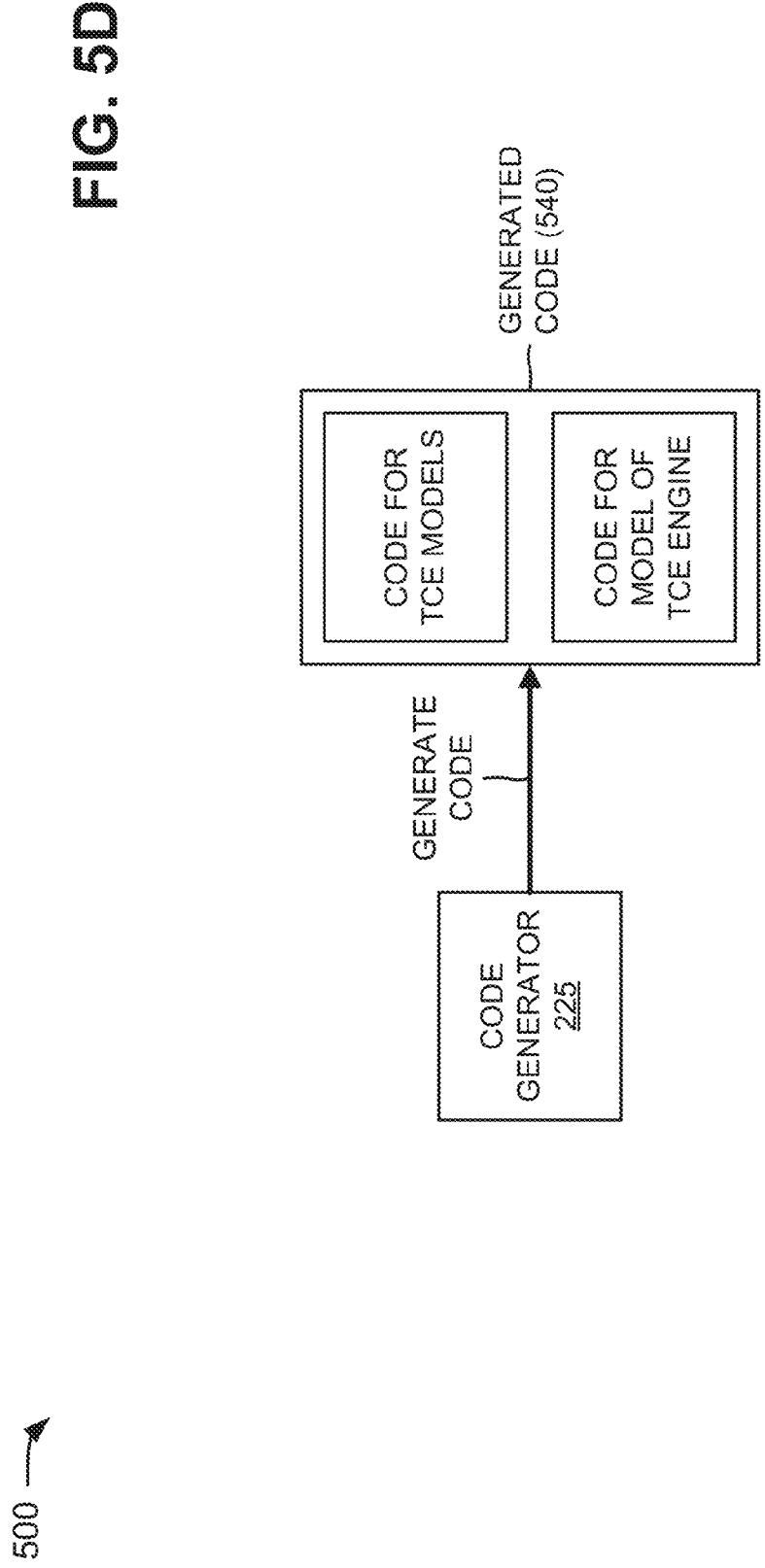

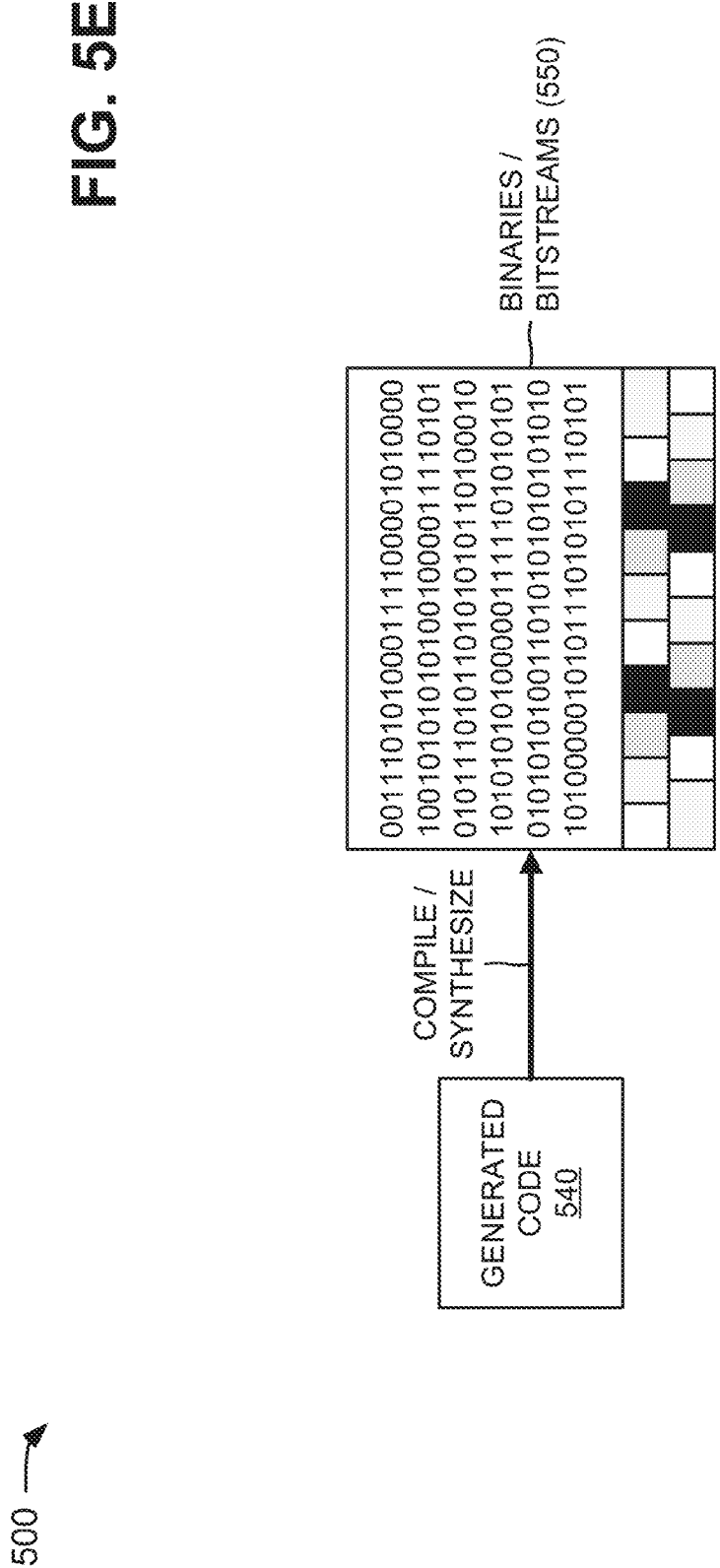

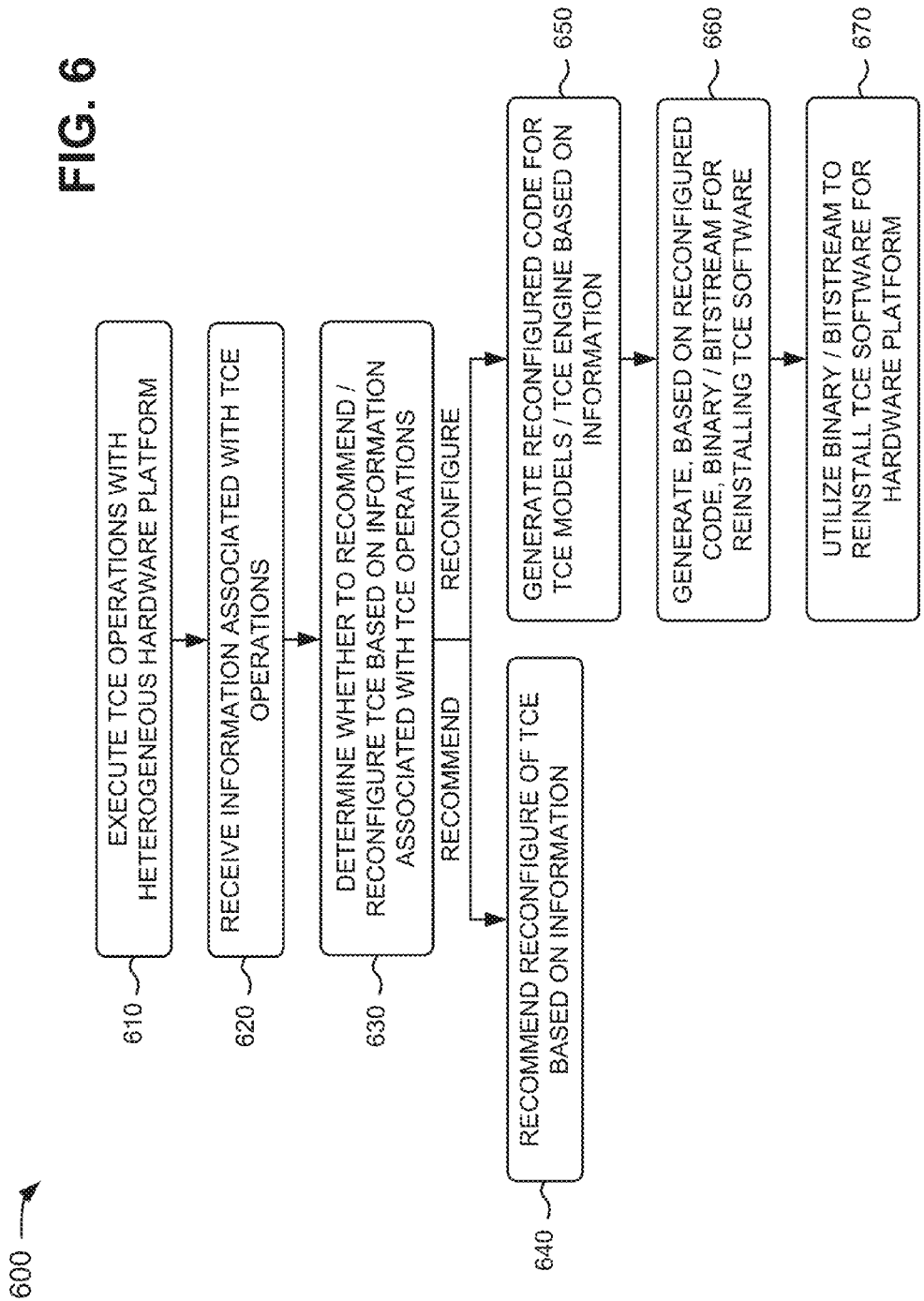

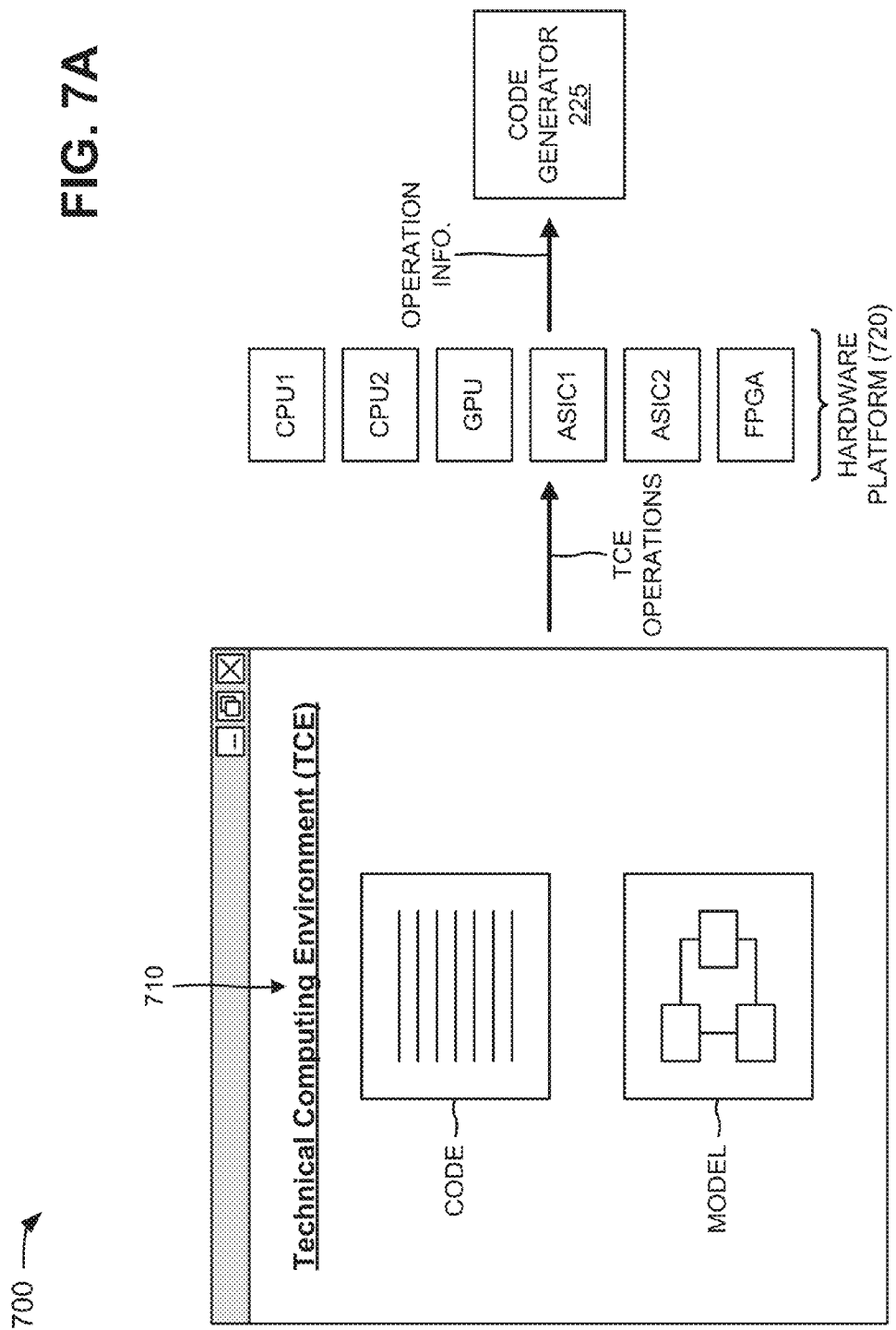

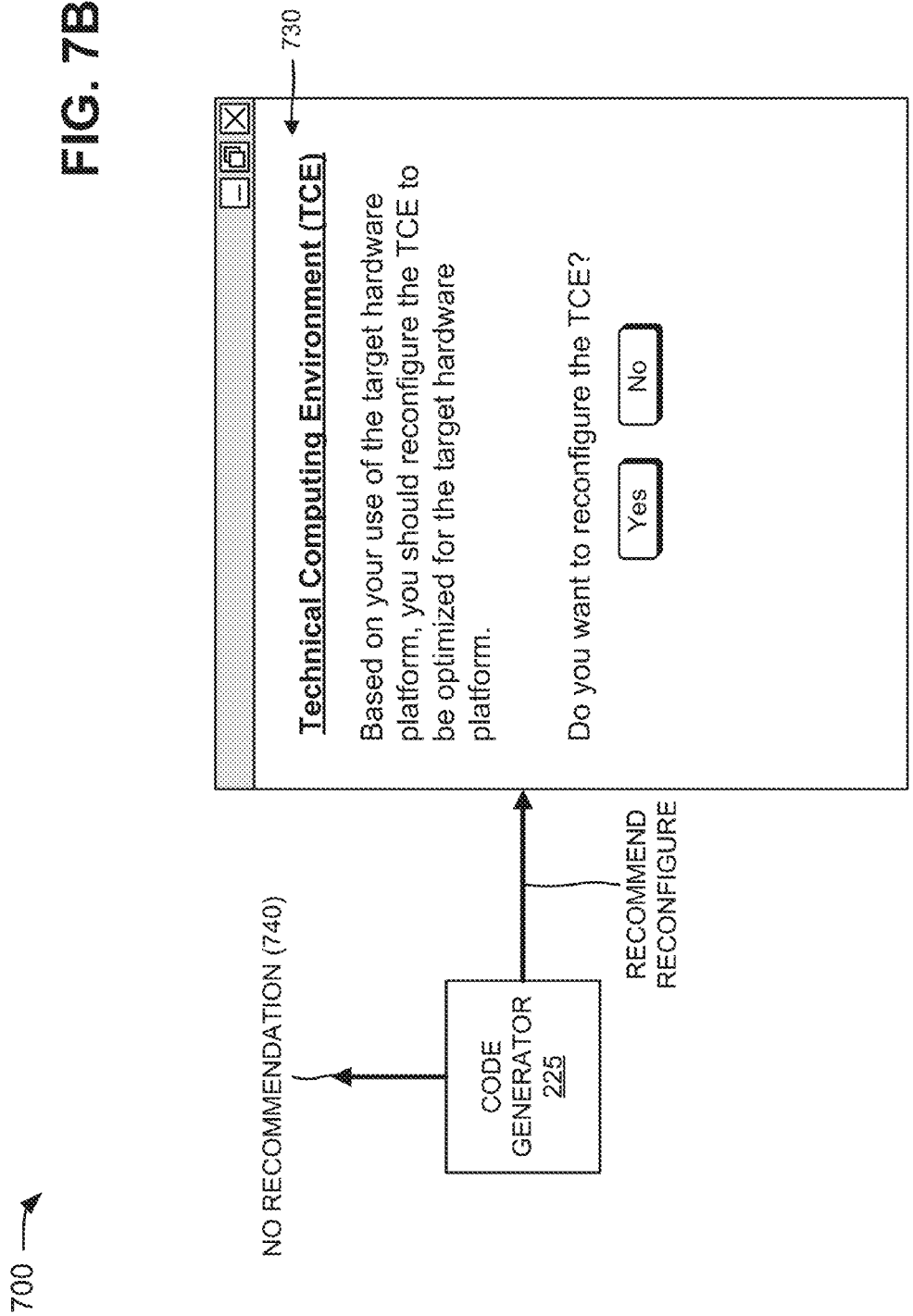

INSTALLATION OF A TECHNICAL COMPUTING ENVIRONMENT CUSTOMIZED FOR A TARGET HARDWARE PLATFORM

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIG. 4 is a flow chart of an example process for installing a technical computing environment customized for a target hardware platform;

FIGS. 5A-5F are diagrams of an example relating to the example process shown in FIG. 4;

FIG. 6 is a flow chart of an example process for reconfiguring a technical computing environment based on use of a target hardware platform; and FIGS. 7A-7F are diagrams of an example relating to the example process shown in FIG. 6.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

In order to enable installation of a TCE on a computing device, TCE software may be precompiled into multiple binary files that support multiple computing device architectures. For example, the TCE software may be precompiled into one or more binary files that support a 32-bit operating system, a 64-bit operating system, a Linux operating system, or other types of operating systems provided on computing devices. A computing device may receive the one or more binary files, and may utilize the one or more binary files to install the TCE software on the computing device. In some implementations, the TCE software may include a graphical model, a graphical model that is distributed as an execution engine model, a model with dynamic typing, a binary file, etc. that can be encrypted or obfuscated so that a customer may not view source code associated with the TCE software.

Figure 1B:
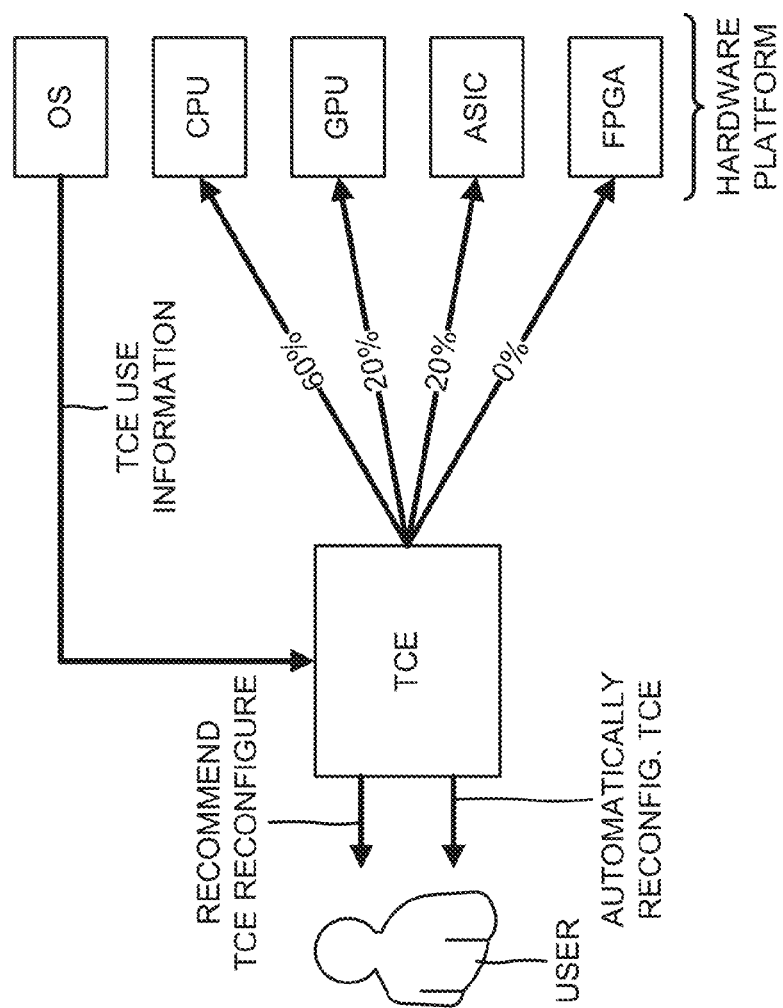

FIGS. 1A and 1B are diagrams of an overview of an example implementation 100 described herein. With reference to FIG. 1A, a computing device may receive TCE software to be installed on the computing device. In some implementations, the TCE software may include a model of a TCE engine to be installed on a hardware platform of the computing device. The TCE engine may be used to perform TCE-based operations (e.g., model execution, matrix calculations, etc.) using the hardware platform. As further shown in FIG. 1A, the hardware platform may include a heterogeneous hardware platform of different types of processing components (e.g., a central processing unit (CPU), a graphical processing unit (GPU), an application-specific integrated circuit (ASIC), a field-programmable gate array (FPGA), etc.). A heterogeneous hardware platform may include a combination of different types of computing components (e.g., different types of computing cores, computing cores combined with signal processing intrinsics, computing cores combined with FPGAs, etc.).

The TCE software may also include a code generator that retrieves (e.g., from an operating system (OS) associated with the computing device) platform information associated with the hardware platform. The platform information may include information identifying the CPU, the GPU, the ASIC, and the FPGA; information associated with the CPU (e.g., a number of cores, a processing speed, etc.); information associated with the GPU (e.g., a processing speed); etc. The code generator may also receive user configuration information provided by a user of the computing device. The user configuration information may include preferences for the TCE as provided by the user during the TCE installation.

As further shown in FIG. 1A, the code generator may generate code for TCE models and the TCE engine based on the TCE software, the platform information, and the user configuration information. In some implementations, the generated code may be tailored to and/or optimized for the hardware platform. For example, a portion of the TCE that may execute more efficiently on the GPU may be identified, in the generated code, as to be executed on the GPU. The generated code may be compiled to generate binaries and/or bitstreams for installing the TCE on the computing device. The binaries and/or bitstreams may be tailored to and/or optimized for the hardware platform, and may be utilized to apply different portions of the TCE for execution on different components of the hardware platform, as further shown in FIG. 1A.

After installing the TCE, the user of the computing device may utilize the TCE to perform TCE operations with the components of the hardware platform. For example, as shown in FIG. 1B, the user may perform 60% of the TCE operations with the CPU, 20% of the TCE operations with the GPU, 20% of the TCE operations with the ASIC, and 0% of the TCE operations with the FPGA. The operating system of the computing device may provide such TCE use information to the TCE, and the TCE may provide the TCE use information to the code generator (not shown in FIG. 1B). The code generator may determine whether to reconfigure the TCE based on the TCE use information. For example, the code generator may determine that the TCE should be reconfigured to eliminate use of the FPGA since the user does not utilize the FPGA. In another example, the code generator may determine that the TCE should be reconfigured at a time when the user does not historically utilize the TCE (e.g., over a weekend, late at night, etc.).

As further shown in FIG. 1B, based on this determination, the code generator may recommend a reconfiguration of the TCE to the user or may automatically reconfigure the TCE. If the code generator recommends that the TCE may be reconfigured, the user may determine whether to follow the recommendation. If the user elects to follow the recommendation, or if the code generator automatically reconfigures the TCE, the code generator may generate reconfigured code for the TCE models and the TCE engine based on the TCE software, the platform information, and the TCE use information. In some implementations, the reconfigured code may be tailored to and/or optimized for the hardware platform based on the TCE use information. The reconfigured code may be compiled to generate binaries and/or bitstreams for reinstalling the TCE for execution on the hardware platform. The binaries and/or bitstreams may be tailored to and/or optimized for the hardware platform, and may be utilized to apply different portions of the TCE for execution on different components of the hardware platform. For example, the binaries and/or bitstreams may not apply a portion of the TCE for execution on the FPGA since the FPGA is not utilized by the user. In some implementations, the reconfigured code may include software, such as, for example, software for virtual machines, middleware, etc. or software that may be executed on different software components, such as virtual machines, middleware, etc.

In some implementations, the TCE may be installed in a cloud computing environment that includes a hardware platform with multiple computing devices, CPUs, GPUs, ASICs, FPGAs, and/or other hardware components. In such implementations, the code generator may determine an optimum hardware platform for a portion of the TCE (e.g., a model of the TCE), such as, for example, a certain number of CPUs, a certain number of GPUs, a certain number of FPGAs, etc.

In some implementations, utilizing models to install a TCE may enable a user to exploit an FPGA coprocessor for general computing applications. This may also provide the user with a suitable and potentially optimal way to exploit parallelism in the user's application given a particular computing platform.

Such an arrangement may enable a TCE to be automatically installed (e.g., without manual input) for execution on a heterogeneous hardware platform, and to be customized for components of the heterogeneous hardware platform. The arrangement may also enable the TCE to operate more efficiently and quickly on the hardware platform. The arrangement may also enable the TCE to be reconfigured based on use of the TCE with the components of the hardware platform. This may enable the hardware platform to be utilized even more efficiently and quickly by the TCE.

FIG. 2 is a diagram of an example environment 200 in which systems and/or methods described herein may be implemented. As shown in FIG. 2, environment 200 may include a client device 210, which may include a technical computing environment (TCE) 220 and a code generator 225. Furthermore, environment 200 may include a server device 230, which may include TCE 220 and code generator 225, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc. In some implementations, TCE 220 may provide high level programming with a dynamically-typed language or an array-based language that may be a form of modeling.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220.

During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler, and may be used with a complex instruction set computer (CISC), reduced instruction set computing (RISC), a microprocessor without interlocked pipeline stages (MIPS), quantum computing, etc.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In some implementations, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Code generator 225 may be provided in client device 210 during the installation of TCE 220 in client device 210. Alternatively, or additionally, code generator 225 may be provided in another device (e.g., server device 230) that is accessible by client device 210. Code generator 225 may retrieve information associated with a hardware platform of client device 210, and may receive user configuration information provided by a user of client device 210. Code generator 225 may generate code for TCE 220 models and a TCE 220 engine based on the hardware platform information and the user configuration information. In some implementations, the generated code may be tailored to and/or optimized for the hardware platform. Code generator 225 may compile the generated code to create binaries and/or bitstreams for installing TCE 220 for execution on the hardware platform. The binaries and/or bitstreams may be utilized to install different portions of TCE 220 for execution on different components of the hardware platform. In some implementations, code generator 225 may be utilized to reconfigure TCE 220 based on use of TCE 220 with the hardware platform.

In some implementations, the TCE engine may include a normal mode, an accelerator mode, and/or a rapid accelerator mode. In the normal mode, the TCE engine may interpret a model during each simulation run. In some implementations, interpreted simulation may include an execution data structure that determines a general control flow necessary to generate behaviors for a model. This general control flow may operate on a data structure of the model, and may, during execution, call functions that operate on elements of an in-memory data structure of the model. In a compiled execution, the control flow may execute model elements directly and may remove much (if not all) of the general interpreted control flow of a simulation. Furthermore, compiled execution may combine the content of functionality for various model elements into a single direct function call. In some implementations, the compiled execution may generate a data structure with a new representation of the overall model that may be executed directly and that may include all the control flow to execute certain model functionality (e.g., output, update, derivatives, etc.). Between fully-interpreted and fully-compiled execution there may be some opportunities for combinations.

In some implementations, the execution engine may include functionality that generates a behavior based on evaluating a model. The evaluation of a model may produce values for model variables, such as, for example, output values, zero crossing values, residuals on implicit equations, derivatives, etc. The execution engine may use the model to produce these variables by providing variable values (e.g., input values, state values, initial condition values, etc.) to the model. The execution engine may then generate a behavior for the model by repeatedly providing variable values that may be determined based on the variable values that the model produced. The execution engine may include a data structure that generates behavior such as information about a current time, a desired future time, a previous time, values of state variables at various times, values of derivatives at various time, initial conditions, a status of applied solvers (e.g., errors, warnings, etc.) etc.

If the model is changed frequently, the normal mode may be used because the normal mode may not require a separate compilation step. In the accelerator mode, the TCE engine may compile a model into a binary shared library or a DLL where possible in order to eliminate block-to-block overhead of an interpreted simulation in the normal mode. The accelerator mode may support a debugger and a profiler. In the rapid accelerator mode, the TCE engine may compile a standalone executable, for a model, that may execute on a separate processing component. The rapid accelerator mode may be used when a full model is capable of generating code, and may restrict interaction with the model during simulations. In some implementations, the TCE engine may include an engine application programming interface (API) (e.g., getDerivatives, getOutput, updState, getState, getZeroCrossing, etc.), and different TCE engines may be generated for different APIs.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220 and/or code generator 225.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing.

Memory 330 may include a random access memory (RAM), a read only memory (ROM), and/or another type of dynamic or static storage component (e.g., a flash, magnetic, or optical memory) that stores information and/or instructions for use by processor 320. In some implementations, processor 320 may include, for example, an ASIC. In some implementations, processor 320 may include, for example, a digital signal processor (DSP) with intrinsic mechanisms that perform dedicated computations, such as fast Fourier transforms, etc.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for installing a technical computing environment customized for a target hardware platform. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving TCE software to be installed on a heterogeneous hardware platform (block 410). For example, client device 210 may include a heterogeneous hardware platform, such as, for example, a hardware platform that includes one or more CPUs, one or more GPUs, one or more ASICs, one or more FPGAs, one or more massively parallel processor arrays (MPPAs), and/or one or more other hardware components. Client device 210 may receive software for installing TCE 220 for execution by the heterogeneous hardware platform. In some implementations, a user of client device 210 may provide the software for installing TCE 220 to client device 210 via an external source, such as, for example, a CD-ROM, a DVD, a flash drive, an external hard drive, etc. In some implementations, client device 210 may receive, via network 240, the software for installing TCE 220 from another device (e.g., server device 230). In some implementations, the heterogeneous hardware platform may include multiple hardware platforms. For example, the heterogeneous hardware platform may include multiple devices provided in a network (e.g., a cloud network).

In some implementations, the software for installing TCE 220 may include one or more models that may be executed by TCE 220, and a model for a TCE engine to be installed on the hardware platform of client device 210. The TCE engine may be used to perform TCE-based operations, described above for TCE 220 (e.g., model execution, matrix calculations, etc.), with the hardware platform of client device 210. In some implementations, the software for installing TCE 220 may include code generator 225, which may be provided in client device 210 during the installation of TCE 220 in client device 210. In some implementations, client device 210 may function as a server (e.g., providing simulation on the Internet and installing the simulation in the cloud for a particular customer that enables client device 210 to function as a server for a select group of people).

As further shown in FIG. 4, process 400 may include receiving user configuration information associated with the TCE software (block 420). For example, the software for installing TCE 220 may provide, to a user of client device 210, requests for information associated with a configuration of TCE 220. In some implementations, the user may respond to the requests with information referred to herein as user configuration information. In some implementations, the user configuration information may be provided to code generator 225. The user configuration information may include, for example, a type of license (e.g., an individual designated user license, an individual designated computer license, a group license, etc.) associated with TCE 220. In some implementations, the user configuration information may include an installation type (e.g., typical or custom) associated with TCE 220. A typical installation may install all licensed products associated with TCE 220, using default settings. A custom installation may require the user to specify which products of TCE 220 to install, to specify installation options for the products, etc. In some implementations, the user configuration information may include an identification of a memory location (e.g., a name of a folder, a name of a memory device, etc.) where TCE 220 is to be installed. In some implementations, the user configuration information may include an identification of products of TCE 220 to install on client device 210, and installation options (e.g., whether to provide shortcuts for TCE 220 on a desktop) associated with the identified products.

In some implementations, the user configuration information may include information associated with the hardware platform of client device 210. For example, the user may specify whether CPUs, GPUs, FPGAs, etc. are utilized when the user performs TCE operations with client device 210. The user may specify a number of CPUs, GPUs, FPGAs, etc. provided in client device 210. In some implementations, the information associated with the hardware platform may be automatically retrieved by code generator 225, rather than provided by the user of client device 210. In some implementations, the user configuration information may include other information that may aid in the installation and/or optimization of TCE 220. In some implementations, the information provided by the user may include information provided by multiple users and stored in a data store. In such implementations, code generator 225 may retrieve the stored information and make a determination for a particular hardware platform based on what users have done in the past for similar hardware platforms.

As further shown in FIG. 4, process 400 may include receiving platform information associated with the heterogeneous hardware platform (block 430). For example, code generator 225 may determine what types of components are provided in the hardware platform of client device 210. In some implementations, code generator 225 may retrieve information identifying the hardware platform components from an operating system associated with client device 210. For example, the operating system may store information associated with the hardware platform components since the operating system acts as an intermediary between programs and the hardware platform components for functions, such as input, output, and memory allocation. Code generator 225 may retrieve, from the operating system, the stored information associated with the hardware platform components. In some implementations, code generator 225 may utilize a detection mechanism to identify the hardware platform components of client device 210. The detection mechanism may analyze the stored information associated with the hardware platform components, and may provide, to code generator 225, some or all of the stored information associated with the hardware platform components.

The information associated with the hardware platform components may include information identifying the hardware platform components; information associated with each of the hardware platform components (e.g., a number of cores, a processing speed, etc.); information associated with an availability of each hardware platform component (e.g., 10%, 20%, etc. availability); etc.

As further shown in FIG. 4, process 400 may include generating code for TCE models and a TCE engine based on the TCE software, the user configuration information, and the platform information (block 440). For example, code generator 225 may generate code based on the software for installing TCE 220, the user configuration information, and/or the information associated with the hardware platform components of client device 210. In some implementations, the generated code may include code for the one or more TCE models to be used by TCE 220 and/or code (e.g., Hardware Description Language (HDL) code) for the model of the TCE engine. In some implementations, the generated code may include code provided in a high-level programming language, an assembly language, an intermediate representation language (e.g., HDL, low level virtual machine (LLVM), etc.), etc. In some implementations, the user may change the TCE engine at a model level. For example, the user may change the model of the TCE engine to include a new integration algorithm.

In some implementations, the code for the model of the TCE engine may include code that is customized, without manual input from the user, for the hardware platform components of client device 210. The code for the model of the TCE engine may be customized since the code is adjusted to specific hardware platform component(s) on which the TCE engine will be executed. For example, the code for the model of the TCE engine may permit better control (e.g., than manual input from the user) over converting floating-point behavior of the TCE engine to fixed-point behavior of the TCE engine. In some implementations, the TCE engine may emulate how fixed-point behavior would be executed on a fixed-point target, but the TCE engine may emulate the fixed-point target on a fixed-point device that may be different than the fixed-point target. For example, the TCE engine may configure a FPGA coprocessor to emulate a fixed-point target. The improved control over the floating-point behavior to fixed-point behavior may be achieved since the code for the model of the TCE engine may be adjusted to specific hardware platform component(s) on which the TCE engine will be executed.

As further shown in FIG. 4, process 400 may include generating, based on the generated code, a binary and/or a bitstream for installing the TCE software (block 450). For example, code generator 225 may compile and/or synthesize the generated code to create one or more binaries and/or bitstreams for installing TCE 220 on client device 210. The binaries may include executable binary files, shared libraries, etc. that may be directly executed by the operating system. The bitstreams may include bitstream files that can be used to configure particular hardware platform components (e.g., a FPGA). In some implementations, the binaries/bitstreams may be adjusted to specific hardware platform component(s) on which the TCE engine will be executed. For example, a binary file may be utilized to install a portion of TCE 220 (e.g., a portion of the TCE engine) for execution by a particular CPU of client device 210. A bitstream file may be utilized to install another portion of TCE 220 (e.g., another portion the TCE engine) for execution by a particular FPGA of client device 210.

As further shown in FIG. 4, process 400 may include utilizing the binary and/or the bitstream to install the TCE software customized for the heterogeneous hardware platform (block 460). For example, code generator 225 may utilize the binaries/bitstreams to install TCE 220 for execution on the hardware platform of client device 210. In some implementations, client device 210 may utilize the binaries/bitstreams to customize the installation of TCE 220 for the hardware platform components of client device 210. For example, a portion of TCE 220 that may execute more quickly on a FPGA than a CPU (e.g., a fixed-point operation), may be allocated to the FPGA, rather than the CPU, by client device 210 via utilization of the binaries/bitstreams. A portion of TCE 220 that may execute more efficiently on a GPU than an ASIC (e.g., large graphics files), may be allocated to the GPU, rather than the ASIC, by client device 210 via utilization of the binaries/bitstreams. In some implementations, a portion of TCE 220 may execute parallel operations, systolic array and/or matrix operations (e.g., via data processing units (DPUs), intrinsics via DPUs, etc.).

After client device 210 utilizes the binaries/bitstreams to install TCE 220 on client device 210, the installation may be complete and TCE 220 may be ready for use. In some implementations, client device 210 may display, to the user, an indication that installation of TCE 220 is complete and that TCE 220 is ready for use. After installation of TCE 220, code generator 225 may begin monitoring use of TCE 220 by the user, as described below in connection with FIGS. 6-7F.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
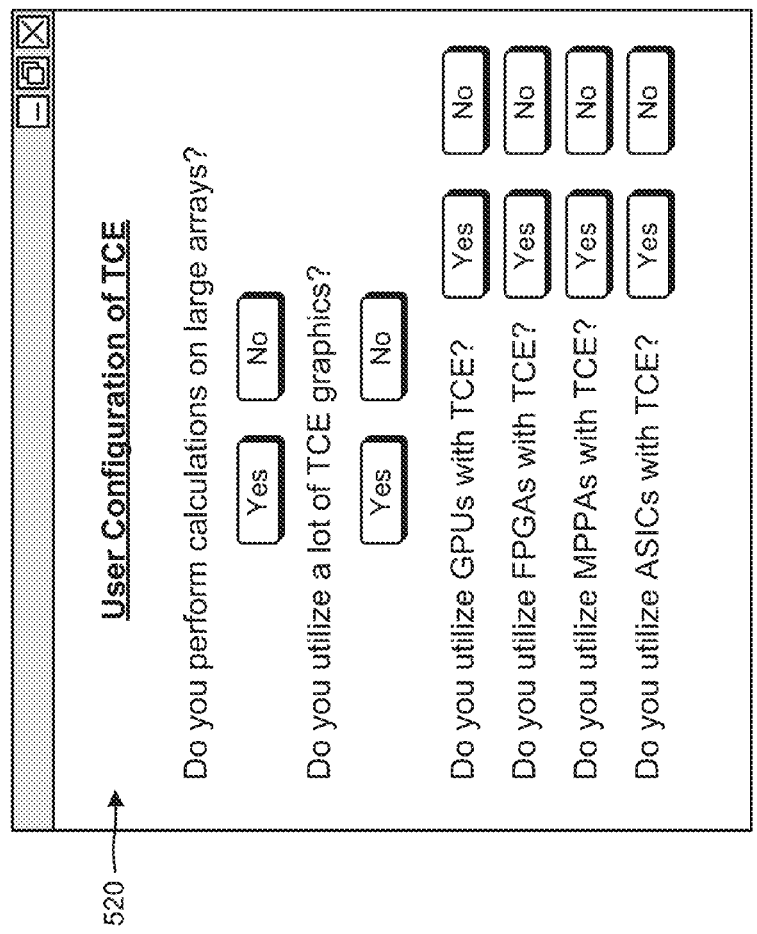

FIGS. 5A-5F are diagrams of an example 500 relating to example process 400 shown in FIG. 4. In example 500, assume that a user associated with client device 210 wishes to install TCE 220 on client device 210. Further assume that the user loads, on client device 210, a CD-ROM that includes software for installing TCE 220. The TCE installation software may cause client device 210 to display a user interface 510, as shown in FIG. 5A. User interface 510 may include one or more options for installing TCE 220 on client device 210. For example, user interface 510 may include an option for installing TCE 220 that is customized for a target hardware platform of client device 210, an option for installing TCE 220 in a typical manner (e.g., not customized for the hardware platform), and an option for reconfiguring a TCE 220 installation based on use of the hardware platform. In example 500, assume that the user selects, with a pointing device (e.g., a mouse), the option for installing TCE 220 that is customized for the target hardware platform, as further shown in FIG. 5A. The option for installing TCE 220 in a typical manner will not be described since it is associated with a typical TCE 220 installation. The option for reconfiguring a TCE 220 installation is described below in connection with FIGS. 6-7F.

After the user selects the option for installing TCE 220 that is customized for the target hardware platform, the TCE installation software may cause client device 210 to display a user interface 520, as shown in FIG. 5B. User interface 520 may request, from the user, user configuration information associated with installation of TCE 220 on client device 210. For example, user interface 520 may include questions that the user may answer. The answers to the questions may be utilized to generate the user configuration information. As shown in FIG. 5B, user interface 520 may include a question about whether the user performs calculations on large arrays. If the user answers yes to this question, the user configuration information may, for example, be updated to recommend utilizing GPUs more for TCE 220 (e.g., if client device 210 includes GPUs) since calculations on large arrays may be performed more efficiently by GPUs. In some implementations, the user configuration information may be updated to recommend utilizing DSPs more to TCE 220 since signal processing operations may be performed more efficiently by DSPs.

User interface 520 may include a question about whether the user utilizes a lot of graphics with TCE 220. If the user answers yes to this question, the user configuration information may, for example, be updated to recommend utilizing GPUs more for TCE 220 (e.g., if client device 210 includes GPUs) since graphics may be provided more efficiently by GPUs. As further shown in FIG. 5B, user interface 520 may include questions about whether the user utilizes particular hardware platform components (e.g., GPUs, CPUs, MPPAs, ASICs, etc.) with TCE 220. If the user answers yes to any of these questions, the user configuration information may be updated to recommend utilizing the particular hardware platform component(s) more for TCE 220 (e.g., if client device 210 includes the particular hardware platform component(s)).

In example 500, assume that the TCE installation software includes one or more models that may be executed by TCE 220, and a model for a TCE engine to be installed on the hardware platform of client device 210. The TCE engine may include the code that executes the one or more models for TCE 220. In some implementations, the TCE engine may include a number of different parts (e.g., a fixed step numerical integrator, a variable-step numerical integrator, a zero crossing detector, a zero crossing locator, a discrete time advance, an algebraic loop solver, chattering algorithms, a mesh generator, etc.) and models for each of the different parts. Further, assume that the TCE installation software causes client device 210 to create code generator 225, and that code generator 225 receives the one or more models, the model for the TCE engine, and the user configuration information.

Figure 5C:
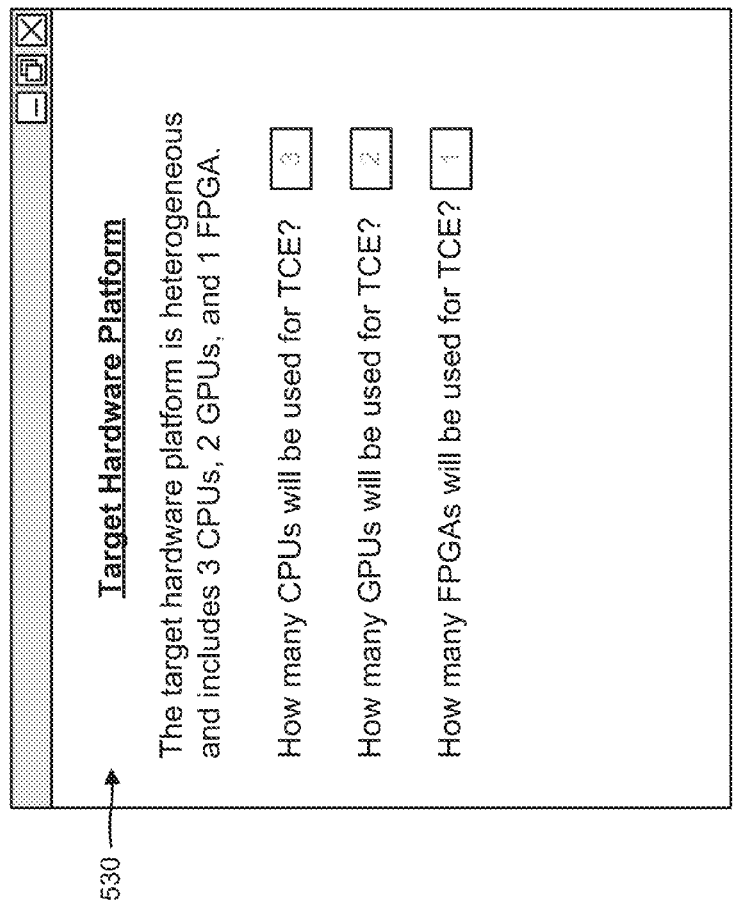

Code generator 225 may retrieve (e.g., from the operating system of client device 210) information associated with the hardware platform components of client device 210. In example 500, assume that code generator 225 determines that the hardware platform of client device 210 is heterogeneous and includes three (3) CPUs, two (2) GPUs, and one (1) FPGA. Based on this determination, assume that the TCE installation software causes client device 210 to display a user interface 530, as shown in FIG. 5C. User interface 530 may include information identifying the hardware platform components (e.g., 3 CPUs, 2 GPUs, and 1 FPGA) of client device 210. User interface 530 may also include a question about how many CPUs the user will use for TCE 220, a question about how many GPUs the user will use for TCE 220, and a question about how many FPGAs the user will use for TCE 220. Based on the user's responses to the questions, the information associated with the hardware platform components of client device 210 may be updated by code generator 225. For example, if the user intends to use only two CPUs for TCE 220, the information associated with the hardware platform components of client device 210 may be updated to include two CPUs (or DSPs) instead of three CPUs (or DSPs).

As shown in FIG. 5D, further assume that code generator 225 generates code 540, for installing TCE 220 on client device 210, based on the one or more models that may be executed by TCE 220, the model for the TCE engine, the user configuration information, and/or the information associated with the hardware platform components of client device 210. As further shown in FIG. 5D, generated code 540 may include code for the one or more TCE models and code (e.g., HDL code) for the model of the TCE engine. Generated code 540 for the model of the TCE engine may include code that is customized for the hardware platform components of client device 210. For example, generated code 540 for the model of the TCE engine may be TCE code that has been customized for the three CPUs, the two GPUs, and the one FPGA of client device 210.

Figure 5F:
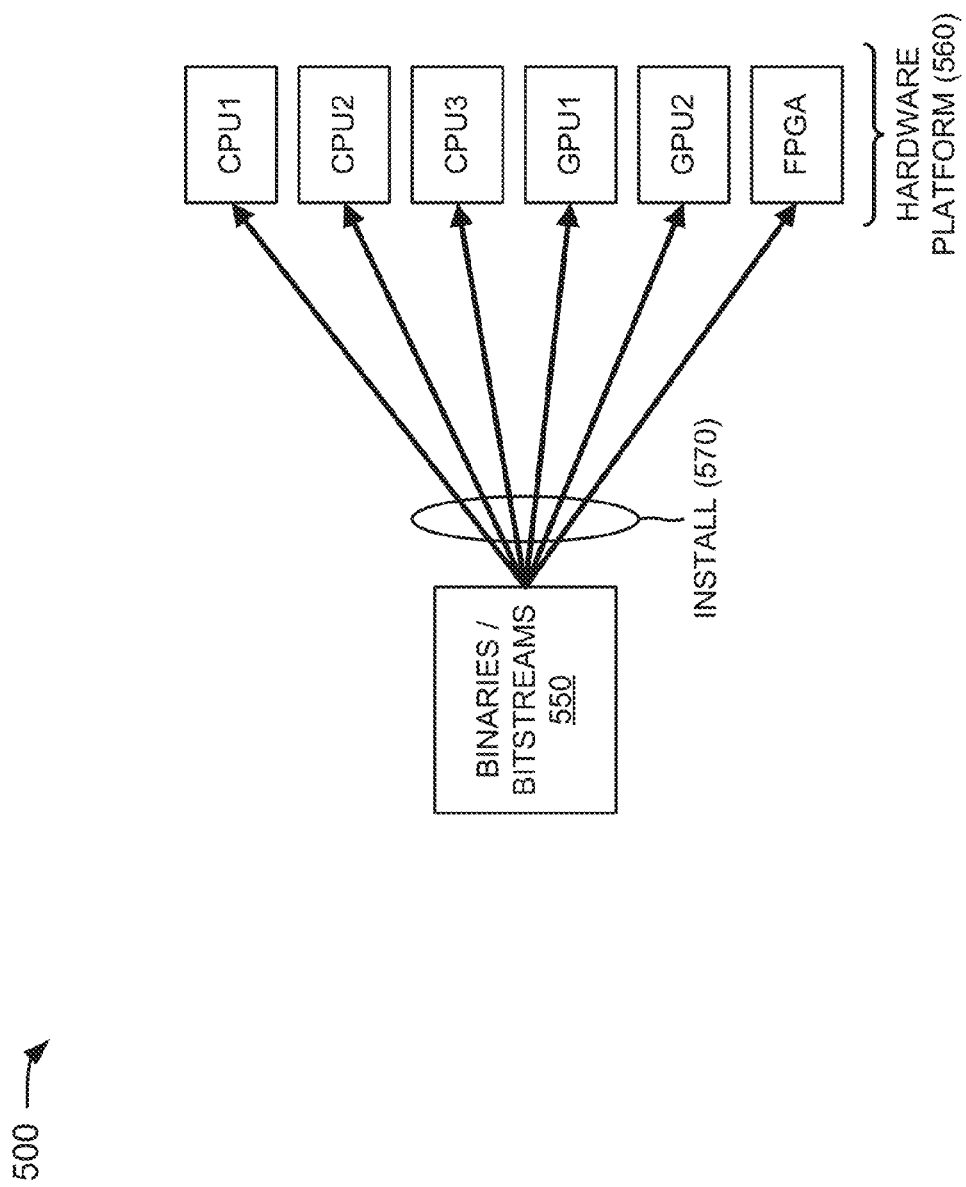

As shown in FIG. 5E, assume that code generator 225 compiles and/or synthesizes generated code 540 to generate one or more binaries and/or bitstreams 550 for installing TCE 220 on client device 210. Binaries/bitstreams 550 may be customized for a hardware platform 560 of client device 210, as shown in FIG. 5F. As further shown in FIG. 5F, hardware platform 560 of client device 210 may include the three CPUs, two GPUs, and one FPGA (or DSP). Binaries/bitstreams 550 may be customized to install portions of TCE 220 for execution on the three CPUs, the two GPUs, and the one FPGA of hardware platform 560, as indicated by reference number 570. For example, a portion of TCE 220 associated with fixed-point operations may be installed for execution on the FPGA, and portions of TCE 220 associated with floating-point operations may be installed for execution on one or more of the CPUs and/or one or more of the GPUs. After client device 210 utilizes binaries/bitstreams 550 to install the portions of TCE 220, the installation may be complete and TCE 220 may be ready for use by the user.

As indicated above, FIGS. 5A-5F are provided merely as an example. Other examples are possible and may differ from what was described with regard to FIGS. 5A-5F.

FIG. 6 is a flow chart of an example process 600 for reconfiguring a technical computing environment based on use of a target hardware platform. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include executing TCE operations with a heterogeneous hardware platform (block 610). For example, after TCE 220 is installed on client device 210, the user may utilize TCE 220 to perform operations, such as, for example, creating models, performing array calculations, etc. In some implementations, TCE 220 may utilize a hardware platform associated with client device 210 to execute the operations provided by the user. In some implementations, the hardware platform of client device 210 may be heterogeneous when the hardware platform includes different types of hardware components (e.g., processing components). For example, the hardware platform of client device 210 may be heterogeneous when the hardware platform includes two or more different types of CPUs, GPUs, MPPAs, ASICs, FPGAs, processing cores, and/or other types of processing components. In some implementations, the hardware platform of client device 210 may be homogeneous when the hardware platform includes a single type of hardware component (e.g., multiple identical CPUs).

As further shown in FIG. 6, process 600 may include receiving information associated with the TCE operations (block 620). For example, code generator 225 may receive information associated with the operations executed by TCE 220 on the hardware platform of client device 210. In some implementations, code generator 225 may receive or retrieve the information associated with the operations executed by TCE 220 from an operating system associated with client device 210. In some implementations, code generator 225 may receive or retrieve, from TCE 220, the information associated with the operations executed by TCE 220. The information associated with the operations executed by TCE 220 may include information identifying the hardware platform components executing the operations, information identifying the operations executed by TCE 220, information identifying usage (e.g., expressed as a percentage in some manner) for each operation by a particular hardware platform component, etc.

As further shown in FIG. 6, process 600 may include determining whether to recommend a reconfiguration of the TCE or automatically reconfigure the TCE based on the information associated with the TCE operations (block 630). For example, code generator 225 may determine whether to recommend a reconfiguration of TCE 220 or automatically reconfigure TCE 220 based on the information associated with the operations executed by TCE 220. In some implementations, code generator 225 may determine to recommend/reconfigure TCE 220 when the information associated with the operations executed by TCE 220 indicates that a portion of TCE 220 may operate more efficiently or quickly on a different hardware platform component of client device 210 than the hardware platform component on which the portion is correctly operating. For example, if the information associated with the operations indicates that a particular portion of TCE 220 is performing fixed-point operations on a CPU of client device 210, code generator 225 may determine that the particular portion of TCE 220 should be executed by a FPGA of client device 210 since a FPGA performs fixed-point operations more quickly than a CPU. If the information associated with the operations indicates that a particular portion of TCE 220 is performing calculations on large arrays with a CPU, code generator 225 may determine that the particular portion of TCE 220 should be executed by a GPU of client device 210 since a GPU performs such calculations more efficiently than a CPU.

In some implementations, when code generator 225 determines that TCE 220 should be reconfigured, code generator 225 may recommend reconfiguration of TCE 220 if the user of client device 210 selects an option (e.g., provided by TCE 220) to recommend reconfiguration of TCE 220 rather than automatically configuring TCE 220. When code generator 225 determines that TCE 220 should be reconfigured, code generator 225 may automatically reconfigure TCE 220 if the user selects another option (e.g., provided by TCE 220) to automatically reconfigure TCE 220. In some implementations, if signal processing operations are utilized, DSP intrinsics may be more efficient than a CPU or a FPGA.

In some implementations, code generator 225 may determine that TCE 220 should not be reconfigured when the information associated with the operations executed by TCE 220 indicates that TCE 220 is operating efficiently on the hardware platform components of client device 210. For example, if the information associated with the operations indicates that a particular portion of TCE 220 is performing graphic intensive operations on a GPU of client device 210, code generator 225 may determine that the particular portion of TCE 220 should continue to be executed by the GPU since a GPU efficiently handles graphic intensive operations. In some implementations, code generator 225 may recommend an additional hardware component (e.g., one that is available but not being used), one or more different code generation options, and/or one or more different compilation options.

As further shown in FIG. 6, if a reconfiguration of the TCE is to be recommended (block 630—RECOMMEND), process 600 may include recommending a reconfiguration of the TCE based on the information associated with the TCE operations (block 640). For example, if the user selects the option to recommend reconfiguration of TCE 220 and code generator 225 determines that TCE 220 should be reconfigured, code generator 225 may cause client device 210 to display a reconfigure recommendation to the user. The reconfigure recommendation may include information recommending that TCE 220 be reconfigured by the user so that TCE 220 may operate better (e.g., more efficiently, quickly, consuming less energy, etc.) on the hardware platform components of client device 210. In some implementations and based on the reconfigure recommendation, the user may cause client device 210 to reinstall TCE 220 in the manner described above in connection with FIGS. 4-5F. In some implementations and based on the reconfigure recommendation, the user may instruct code generator 225 to reconfigure TCE 220 in a manner described below in connection with process blocks 650-670.

As further shown in FIG. 6, if the TCE is to be automatically reconfigured (block 630—RECONFIGURE), process 600 may include generating reconfigured code for TCE models and a TCE engine based on the information associated with the TCE operations (block 650). For example, if the user selects the option to automatically reconfigure TCE 220 and code generator 225 determines that TCE 220 should be reconfigured, code generator 225 may generate reconfigured code based on the information associated with the operations executed by TCE 220. In some implementations, the reconfigured code may include reconfigured code for the one or more TCE models to be used by TCE 220 and/or reconfigured code (e.g., HDL code) for the model of the TCE engine. In some implementations, the reconfigured code for the model of the TCE engine may be customized for the hardware platform components of client device 210 based on the information associated with the operations executed by TCE 220. For example, the reconfigured code may reassign a portion of TCE 220 from one type of component to another different type of component; may reassign a portion of TCE 220 from one type of component to another component of the same type; may reassign a portion of TCE 220 from one component of one type to two components of that same type; may reassign a portion of TCE 220 from one component of one type to two components of different types; etc. In some implementations, code generator 225 may generate code with different options. For example, code with function arguments as globals may be generated to save stack space, reusable functions may be generated to reduce a memory footprint of the TCE binary, loops may be unrolled, functions may be inlined or outlined, etc.

As further shown in FIG. 6, process 600 may include generating, based on the reconfigured code, a binary and/or a bitstream for reinstalling the TCE software (block 660). For example, code generator 225 may compile and/or synthesize the reconfigured code to create one or more binaries and/or bitstreams for reinstalling TCE 220 on client device 210. In some implementations, the binaries/bitstreams may be configured to specific hardware platform component(s) on which the TCE engine will be executed. For example, a binary file may be utilized to reinstall a portion of TCE 220 (e.g., a portion of the TCE engine that performs floating-point operations) for execution on a particular GPU of client device 210. A bitstream file may be utilized to reinstall another portion of TCE 220 (e.g., another portion of the TCE engine that performs fixed-point operations) for execution on a particular FPGA of client device 210.

As further shown in FIG. 6, process 600 may include utilizing the binary and/or the bitstream to reinstall the TCE software for the heterogeneous hardware platform (block 670). For example, code generator 225 may utilize the binaries/bitstreams to reinstall TCE 220 for the hardware platform of client device 210. In some implementations, client device 210 may utilize the binaries/bitstreams to customize the reinstallation of TCE 220 for the hardware platform components of client device 210 based on the information associated with the operations executed by TCE 220. For example, a portion of TCE 220 that performs operations that execute more quickly on a FPGA than a CPU (e.g., a fixed-point operation), may be allocated to the FPGA, rather than the CPU, by client device 210 via utilization of the binaries/bitstreams. A portion of TCE 220 that performs operations that execute more efficiently on a GPU than an ASIC (e.g., large graphics files), may be allocated to the GPU, rather than the ASIC, by client device 210 via utilization of the binaries/bitstreams. In some implementations, a portion of TCE 220 that performs signal processing operations may be allocated to a DSP.

After client device 210 utilizes the binaries/bitstreams to reinstall TCE 220, the reinstallation/reconfiguration may be complete and TCE 220 may be ready for use. In some implementations, client device 210 may display, to the user, an indication that the reinstallation/reconfiguration of TCE 220 is complete and that TCE 220 is ready for use. After the reinstallation/reconfiguration of TCE 220, code generator 225 may once again begin monitoring use of TCE 220 by the user. In some implementations, code generator 225 may enable the user to reset a configuration of TCE 220 to an earlier configuration.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7C:
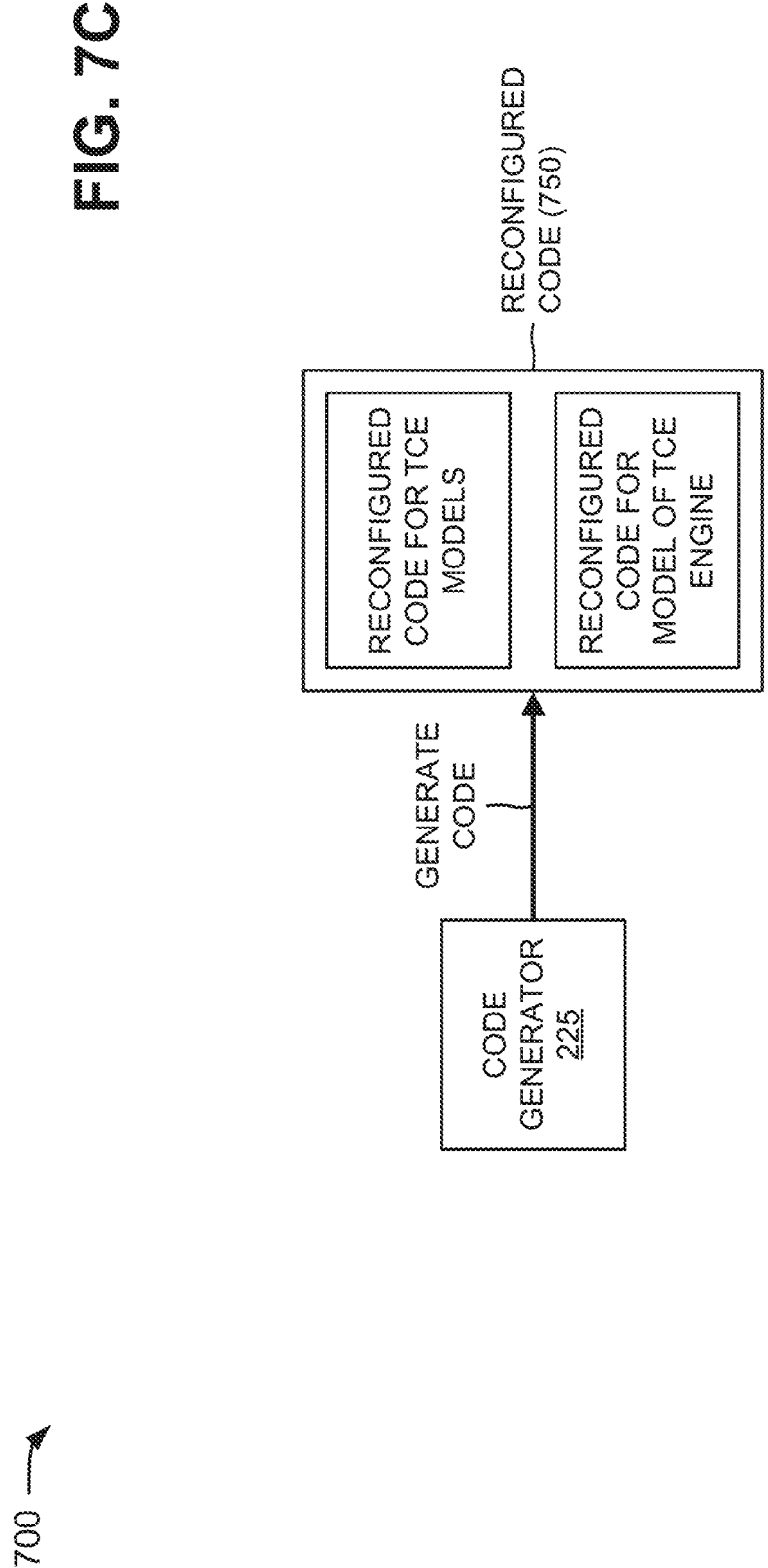

FIGS. 7A-7F are diagrams of an example 700 relating to example process 600 shown in FIG. 6. In example 700, assume that a user of client device 210 installs TCE 220 on client device 210 and wants to utilize TCE 220. Further, assume that TCE 220 causes client device 210 to display a user interface 710 associated with TCE 220, as shown in FIG. 7A. User interface 710 may enable the user to perform operations with TCE 220. For example, the user may utilize user interface 710 to create code for TCE 220, to create a model for TCE 220, etc. In example 700, further assume that client device 210 includes a heterogeneous hardware platform 720 with two CPUs, one GPU, two ASICs, and one FPGA. As further shown in FIG. 7A, the TCE operations performed via user interface 710 may be executed by one or more components of hardware platform 720.

Execution of the TCE operations by hardware platform 720 may generate operation information that may be received or retrieved by code generator 225, as shown in FIG. 7A. The operation information may include information identifying components of hardware platform 720 that are executing the TCE operations, information identifying the TCE operations; information identifying usage (e.g., 10%, 20%, etc. of a first CPU is utilized) for the TCE operations by each component of hardware platform 720; information associated with stack usage, memory usage, power consumption, load per core, bus traffic, network traffic, etc.; etc.

Code generator 225 may determine whether to recommend a reconfiguration of TCE 220 based on the operation information. As shown in FIG. 7B, if code generator 225 decides to recommend a reconfiguration of TCE 220, code generator 225 may generate a user interface 730. User interface 730 may include a recommendation that states "Based on your use of the target hardware platform, you should reconfigure the TCE to be optimized for the target hardware platform." Optimized may mean an improvement of performance over some criteria and not necessarily an absolute best performance. User interface 730 may also ask whether the user wants to reconfigure TCE 220 based on the recommendation. As further shown in FIG. 7B, if code generator 225 decides to not recommend a reconfiguration of TCE 220, code generator 225 may not generate the recommendation, as indicated by reference number 740. In some implementations, if code generator 225 determines that a reconfiguration of TCE 220 is warranted, code generator 225 may automatically reconfigure TCE 220 without providing user interface 730.

If the user decides to reconfigure TCE 220 based on the recommendation of user interface 730, code generator 225 may generate reconfigured code 750 based on the operation information, as shown in FIG. 7C. As further shown in FIG. 7C, reconfigured code 750 may include reconfigured code for one or more TCE models to be used by TCE 220 and/or reconfigured code for a model of a TCE engine. In example 700, assume that the reconfigured code for the model of the TCE engine is customized for hardware platform 720 based on the operation information. For example, assume that a particular portion of TCE 220 performs graphic intensive operations on a CPU of hardware platform 720. In such a situation, the reconfigured code for the model of the TCE engine may cause the particular portion of TCE 220 to be executed by a GPU of hardware platform 720 since a GPU performs graphic intensive operations more efficiently than a CPU.

Figure 7D:
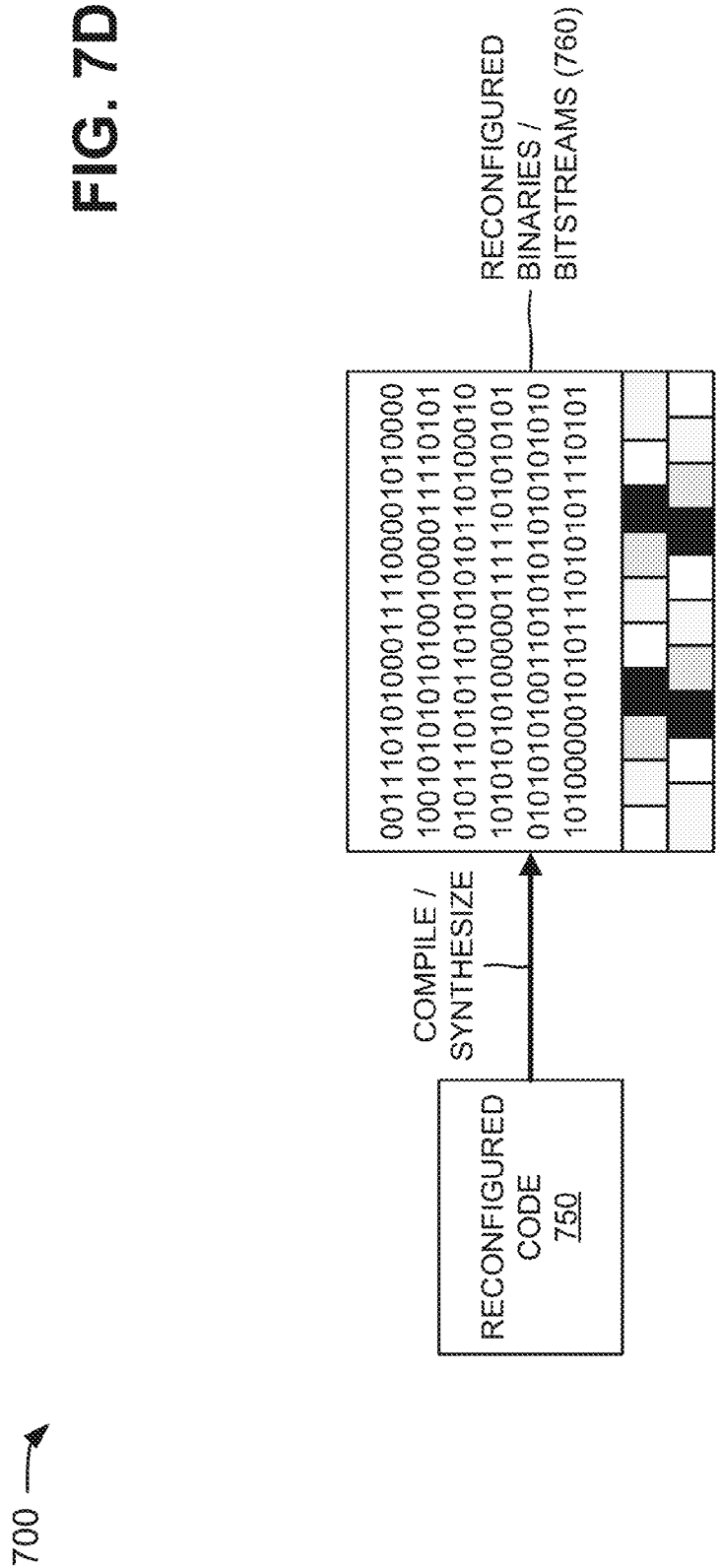

As shown in FIG. 7D, assume that code generator 225 compiles and/or synthesizes reconfigured code 750 to create one or more reconfigured binaries and/or bitstreams 760 for reinstalling TCE 220 on client device 210. In example 700, assume that reconfigured binaries/bitstreams 760 are customized for component(s) of hardware platform 720 on which the TCE engine will be executed. For example, a binary file may be customized to reinstall a portion of the TCE engine, which performs floating-point operations, for execution on the GPU of hardware platform 720. A bitstream file may be utilized to reinstall another portion of the TCE engine, which performs fixed-point operations, for execution on the FPGA of hardware platform 720.

Figure 7E:
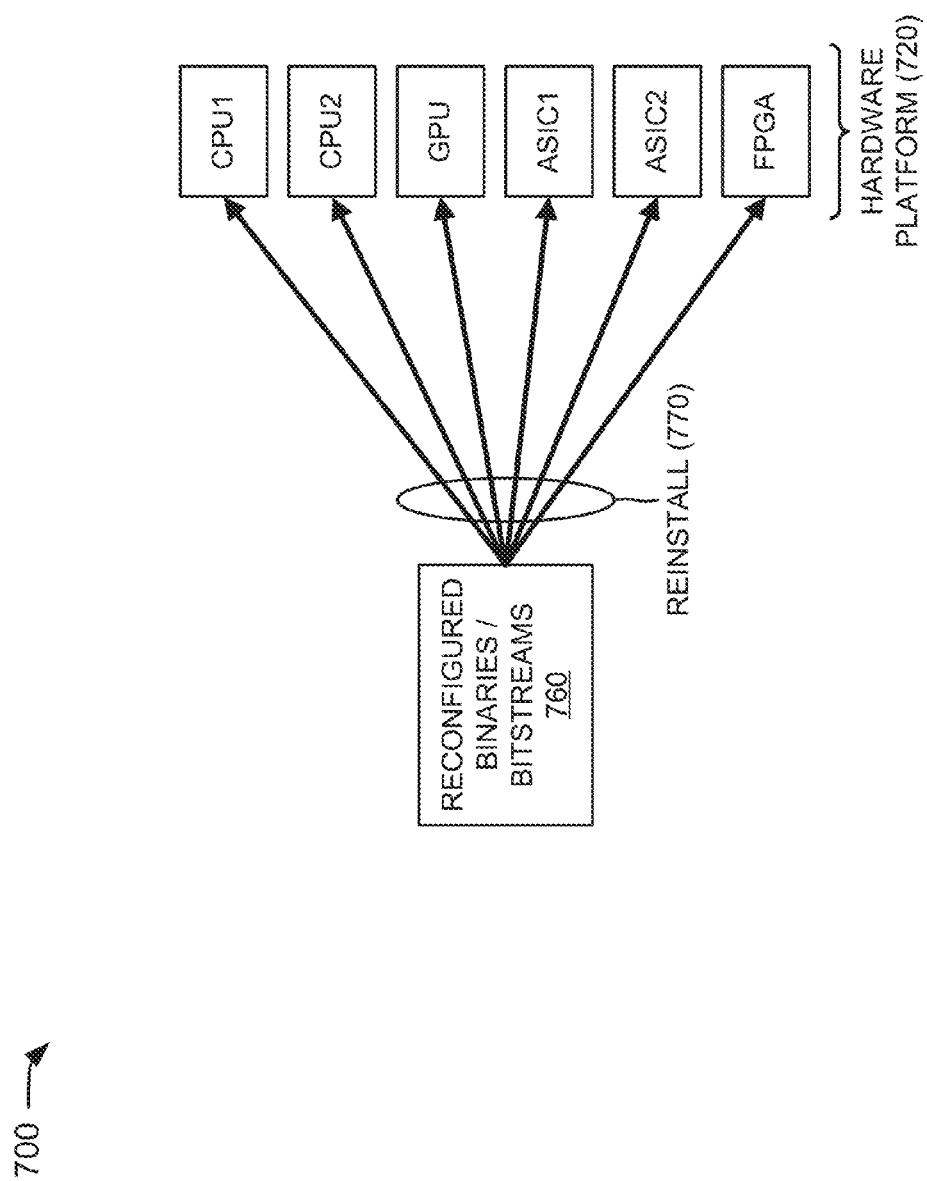

In example 700, assume that code generator 225 utilizes reconfigured binaries/bitstreams 760 to reinstall or reconfigure TCE 220 on hardware platform 720, as indicated by reference number 770 in FIG. 7E. Reconfigured binaries/bitstreams 760 may customize the reinstallation of TCE 220 for hardware platform 720 based on the operation information. For example, a portion of TCE 220 that performs operations that execute more quickly on an ASIC than a GPU, may be allocated to ASIC1, rather than the GPU, by reconfigured binaries/bitstreams 760. A portion of TCE 220 that performs operations that execute more efficiently on a CPU than an FPGA, may be allocated to CPU2, rather than the FPGA, by reconfigured binaries/bitstreams 760.

Figure 7F:
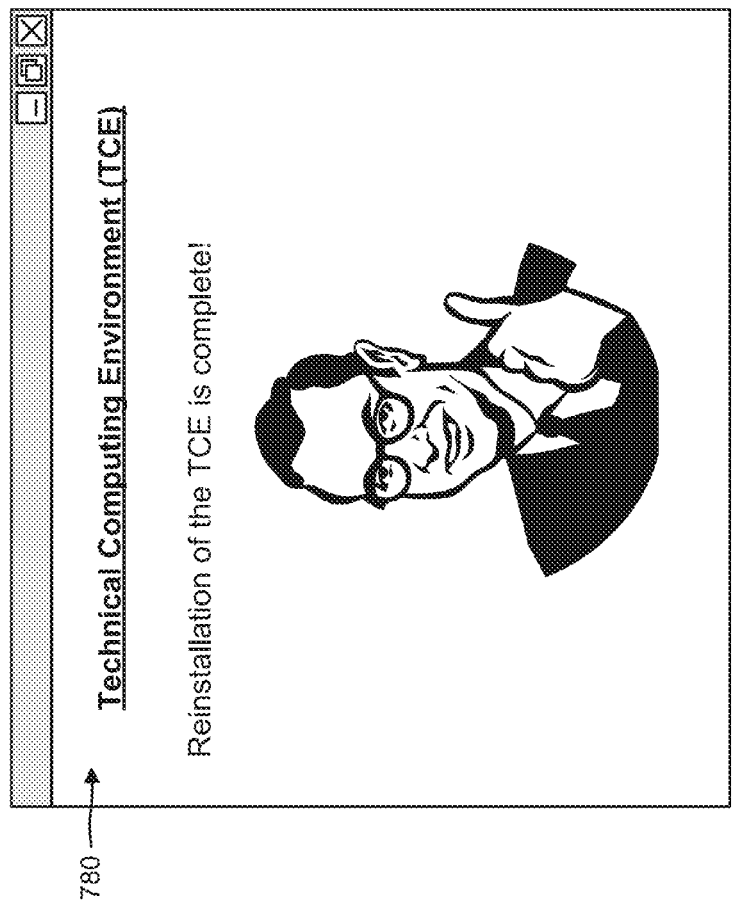

After reconfigured binaries/bitstreams 760 reinstall TCE 220, the reinstallation/reconfiguration of TCE 220 may be complete and TCE 220 may be ready for use. As shown in FIG. 7F, assume that client device 210 displays, to the user, a user interface 780 indicating that the reinstallation/reconfiguration of TCE 220 is complete and that TCE 220 is ready for use.

As indicated above, FIGS. 7A-7F are provided merely as an example. Other examples are possible and may differ from what was described with regard to FIGS. 7A-7F.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may not require further processing to execute (e.g., C++ code, C code, Fortran code, Hardware Description Language (HDL) code, very-high-speed integrated circuits (VHSIC) HDL (VHDL) code, Verilog, Java, and/or other types of hardware or software based code that may be compiled and/or synthesized). In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

The term model is to be broadly interpreted to include a textual model; a block diagram model with one or more model elements (e.g., blocks), one or more inputs, and one or more outputs; a combination of a textual model and a graphical model; a variable step solver model; etc. Each of the model elements may include a representation (e.g., a block) of a hardware device, a subsystem, another model, etc. of a system being modeled. A model may require further processing before the model can be compiled into a binary file, synthesized into a bitstream, etc. A model may be declarative in that the model may not permit a user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A method, comprising:
receiving installation software for installing a technical computing environment to be executed by a hardware platform of a device, the receiving the installation software being performed by the device;
receiving platform information associated with the hardware platform,
the receiving the platform information being performed by the device;
generating code for the technical computing environment based on the installation software and the platform information,
the generating the code being performed by the device;
generating, based on the code, one or more binary files or bitstream files for installing the technical computing environment on the device,
the generating the one or more binary files or bitstream files being performed by the device;
utilizing the one or more binary files or bitstream files to install a customized version of the technical computing environment on the device and for execution by the hardware platform,
the utilizing the one or more binary files or bitstream files being performed by the device;
receiving use information associated with executing operations for the technical computing environment with the hardware platform,
the receiving the use information being performed by the device;
determining whether to reconfigure the technical computing environment based on the use information,
the determining whether to reconfigure the technical computing environment being performed by the device; and
at least one of:
reconfiguring the technical computing environment when the use information indicates that the technical computing environment is to be reconfigured, or
recommending a reconfiguration of the technical computing environment when the use information indicates that the technical computing environment is to be reconfigured.

2. The method of claim 1, further comprising:
receiving, from a user of the device, user configuration information associated with the technical computing environment; and
generating the code for the technical computing environment based additionally on the user configuration information.

3. The method of claim 1, where the platform information includes one or more of:
information identifying components of the hardware platform,
information associated with capabilities of each of the components of the hardware platform, or
information associated with an availability of each of the components of the hardware platform.

4. The method of claim 1, where reconfiguring the technical computing environment comprises:
generating reconfigured code for the technical computing environment when the use information indicates that the technical computing environment is to be reconfigured.

5. The method of claim 4, where reconfiguring the technical computing environment further comprises:
generating, based on the reconfigured code, one or more reconfigured binary files or bitstream files for reinstalling the technical computing environment on the device; and
utilizing the one or more reconfigured binary files or bitstream files to reinstall the technical computing environment on the device.

6. The method of claim 1, further comprising:
generating the code for the technical computing environment using one of a model, a declarative model, an imperative model, an array-based model, a time-based model, or a state transition model.

7. The method of claim 1, where the hardware platform includes a heterogeneous hardware platform.

8. The method of claim 7, where the heterogeneous hardware platform includes a field-programmable gate array (FPGA).

9. The method of claim 1, further comprising:
receiving historical use information associated with execution of the operations for the technical computing environment by the hardware platform; and
reconfiguring the technical computing environment when the historical use information indicates that the technical computing environment is to be reconfigured.

10. The method of claim 1, further comprising:
recommending the reconfiguration of the technical computing environment when the use information indicates that the technical computing environment is to be reconfigured.

11. A device, comprising:
one or more processors to:
receive installation software for installing a technical computing environment to be executed by a heterogeneous hardware platform,
the heterogeneous hardware platform including at least two different types of processing components,
execute the installation software to implement a code generator to:
receive platform information associated with the heterogeneous hardware platform, and
generate code for the technical computing environment based on the installation software and the platform information,
generate, based on the code, one or more binary files or bitstream files for installing the technical computing environment on the heterogeneous hardware platform,
utilize the one or more binary files or bitstream files to install the technical computing environment on the heterogeneous hardware platform,
the technical computing environment being customized for the heterogeneous hardware platform,
utilize the code generator to:
receive use information associated with executing operations for the technical computing environment with the heterogeneous hardware platform,
determine whether to reconfigure the technical computing environment based on the use information, and
at least one of:
reconfigure the technical computing environment when the use information indicates that the technical computing environment is to be reconfigured, or
recommend a reconfiguration of the technical computing environment when the use information indicates that the technical computing environment is to be reconfigured.

12. The device of claim 11, where the one or more processors are further
utilize the code generator to:
receive, from a user of the device, user configuration information associated with the technical computing environment, and
generate the code for the technical computing environment based additionally on the user configuration information.

13. The device of claim 11, where the platform information includes one or more of:
information identifying the processing components of the heterogeneous hardware platform,
information associated with capabilities of each of the processing components of the heterogeneous hardware platform, or
information associated with an availability of each of the processing components of the heterogeneous hardware platform.

14. The device of claim 11, where the processing components include one or more of:
central processing units (CPUs),
graphical processing units (GPUs),
application-specific integrated circuits (ASICs),
field-programmable gate arrays (FPGAs),
massively parallel processor arrays (MPPAs),
digital signal processors (DSPs),
complex instruction set computers (CISCs), or
reduced instruction set computing (RISC).

15. The device of claim 11, where the one or more processors, when reconfiguring the technical computing environment, are further to:
utilize the code generator to:
generate reconfigured code for the technical computing environment when the use information indicates that the technical computing environment is to be reconfigured.

16. The device of claim 15, where the reconfigured code includes instructions to one of:
reassign a portion of the technical computing environment from one type of processing component to another different type of processing component,
reassign the portion of the technical computing environment from the one type of processing component to another processing component of the same type,
reassign the portion of the technical computing environment from the one type of processing component to two processing components of that same type, or
reassign the portion of the technical computing environment from the one type of processing component to two processing components of different types.

17. The device of claim 11, where the one or more processors are further to:
recommend the reconfiguration of the technical computing environment when the use information indicates that the technical computing environment is to be reconfigured.

18. A computer-readable medium storing instructions, the instructions comprising:
one or more instructions that, when executed by one or more processors of a device, cause the one or more processors to:
receive installation software for installing a technical computing environment to be executed by a heterogeneous hardware platform,
receive platform information associated with the heterogeneous hardware platform,
generate code for the technical computing environment based on the installation software and the platform information,
generate, based on the code, one or more binary files or bitstream files for installing the technical computing environment on the heterogeneous hardware platform, and
utilize the one or more binary files or bitstream files to install the technical computing environment on the heterogeneous hardware platform and for execution by the heterogeneous hardware platform,
the technical computing environment being customized for the heterogeneous hardware platform,
receive use information associated with executed operations for the technical computing environment with the heterogeneous hardware platform,
determine whether to reconfigure the technical computing environment based on the use information, and
at least one of:
reconfigure the technical computing environment when the use information indicates that the technical computing environment is to be reconfigured, or
recommend a reconfiguration of the technical computing environment when the use information indicates that the technical computing environment is to be reconfigured.

19. The computer-readable medium of claim 18, where the instructions further comprise:
one or more instructions that, when executed by the one or more processors, cause the one or more processors to:
receive, from a user of the device, user configuration information associated with the technical computing environment, and
generate the code for the technical computing environment based additionally on the user configuration information.

20. The computer-readable medium of claim 18, where the platform information includes one or more of:
information identifying processing components of the heterogeneous hardware platform,
information associated with capabilities of each of the processing components of the heterogeneous hardware platform, or
information associated with an availability of each of the processing components of the heterogeneous hardware platform.

21. The computer-readable medium of claim 18, where:
the heterogeneous hardware platform includes a first processing component and a second processing component, and
the generating code includes generating code for installing a first portion of the technical computing environment on the first processing component and a second portion of the technical computing environment on the second processing component.

22. The computer-readable medium of claim 18, where the instructions further comprise:
one or more instructions that, when reconfiguring the technical computing environment, cause the one or more processors to:
generate reconfigured code for the technical computing environment when the use information indicates that the technical computing environment is to be reconfigured,
generate, based on the reconfigured code, one or more reconfigured binary files or bitstream files for reinstalling the technical computing environment on the heterogeneous hardware platform, and utilize the one or more reconfigured binary files or bitstream files to reinstall the technical computing environment on the heterogeneous hardware platform.

23. The computer-readable medium of claim 18, where the instructions further comprise:

one or more instructions that, when executed by the one or more processors, cause the one or more processors to:

recommend the reconfiguration of the technical computing environment when the use information indicates that the technical computing environment is to be reconfigured.

* * * * *